(12) United States Patent
Björkengren et al.

(10) Patent No.: US 9,226,041 B2
(45) Date of Patent: Dec. 29, 2015

(54) METHOD AND DEVICE FOR IMPOSING USAGE CONSTRAINTS OF DIGITAL CONTENT

(75) Inventors: Ulf Björkengren, Bjärred (SE); Frank Hartung, Herzogenrath (DE); Daniel Catrein, Würselen (DE); Yi Cheng, Sundbyberg (SE)

(73) Assignee: ST-ERICSSON SA, Plan-les-Ouates (CH)

( * ) Notice: Subject to any disclaimer, the term of this patent is extended or adjusted under 35 U.S.C. 154(b) by 62 days.

(21) Appl. No.: 13/509,791

(22) PCT Filed: Nov. 16, 2010

(86) PCT No.: PCT/EP2010/067573
§ 371 (c)(1),
(2), (4) Date: Oct. 8, 2012

(87) PCT Pub. No.: WO2011/061186
PCT Pub. Date: May 26, 2011

(65) Prior Publication Data
US 2013/0024951 A1    Jan. 24, 2013

Related U.S. Application Data

(60) Provisional application No. 61/262,592, filed on Nov. 19, 2009.

(30) Foreign Application Priority Data

Jun. 21, 2010    (EP) .................................... 10166689

(51) Int. Cl.
*G06F 11/00*    (2006.01)
*H04N 21/6543*    (2011.01)
(Continued)

(52) U.S. Cl.
CPC ............ *H04N 21/6543* (2013.01); *G06F 21/10* (2013.01); *H04N 21/2541* (2013.01); *H04N 21/43853* (2013.01); *H04N 21/835* (2013.01); *H04N 21/8352* (2013.01); *H04N 21/8355* (2013.01); *H04N 21/8586* (2013.01)

(58) Field of Classification Search
CPC ......................... G06F 21/10; G06F 2221/2137
USPC ............................................................ 726/30
See application file for complete search history.

(56) References Cited

U.S. PATENT DOCUMENTS

2006/0085816 A1    4/2006    Funk et al.
2007/0124045 A1    5/2007    Ayoub et al.
(Continued)

OTHER PUBLICATIONS

PCT International Search Report, dated Apr. 20, 2011, in connection with International Application No. PCT/EP2010/067573.
(Continued)

*Primary Examiner* — Izunna Okeke
*Assistant Examiner* — Bryan Wright
(74) *Attorney, Agent, or Firm* — Leffler Intellectual Property Law, PLLC

(57) ABSTRACT

Imposing one or more usage constraints on digital content involves communicating a digital content data item to a digital content receiver system. The digital content data item includes the digital content and a usage constraint data item different from a digital license data item, or a reference to the usage constraint data item, the use case item being indicative of the one or more usage constraints.

13 Claims, 2 Drawing Sheets

(51) Int. Cl.
*G06F 21/10* (2013.01)
*H04N 21/254* (2011.01)
*H04N 21/4385* (2011.01)
*H04N 21/835* (2011.01)
*H04N 21/8352* (2011.01)
*H04N 21/8355* (2011.01)
*H04N 21/858* (2011.01)

(56) References Cited

U.S. PATENT DOCUMENTS

| | | | |
|---|---|---|---|
| 2008/0052739 A1 | 2/2008 | Logan | |
| 2009/0031431 A1* | 1/2009 | Boccon-Gibod | 726/30 |
| 2010/0293058 A1* | 11/2010 | Maher et al. | 705/14.66 |
| 2010/0325737 A1* | 12/2010 | Fahn et al. | 726/28 |
| 2011/0231567 A1* | 9/2011 | Lee et al. | 709/231 |
| 2011/0231870 A1* | 9/2011 | Hartung et al. | 725/25 |
| 2013/0104241 A1* | 4/2013 | Blom et al. | 726/26 |

OTHER PUBLICATIONS

Marlin Developer Community: "Marlin Broadband Transport Stream Specification Version 1.0.1", Jul. 31, 2008, XP002630070. Retrieved from the internet: URL:http://www.marlin-community.com/.

Marlin Developer Community: "Marlin Dynamic Media Zones Version 1.0", Jan. 25, 2008, XP002630071. Retrieved from the internet: URL:http://www.marlin-community.com/.

Marlin Developer Community: "Marlin Broadband Delivery System Specification Version 1.2.2", Feb. 27, 2009, XP002630072. Retrieved from the internet: URL:http://www.marlin-community.com/.

* cited by examiner

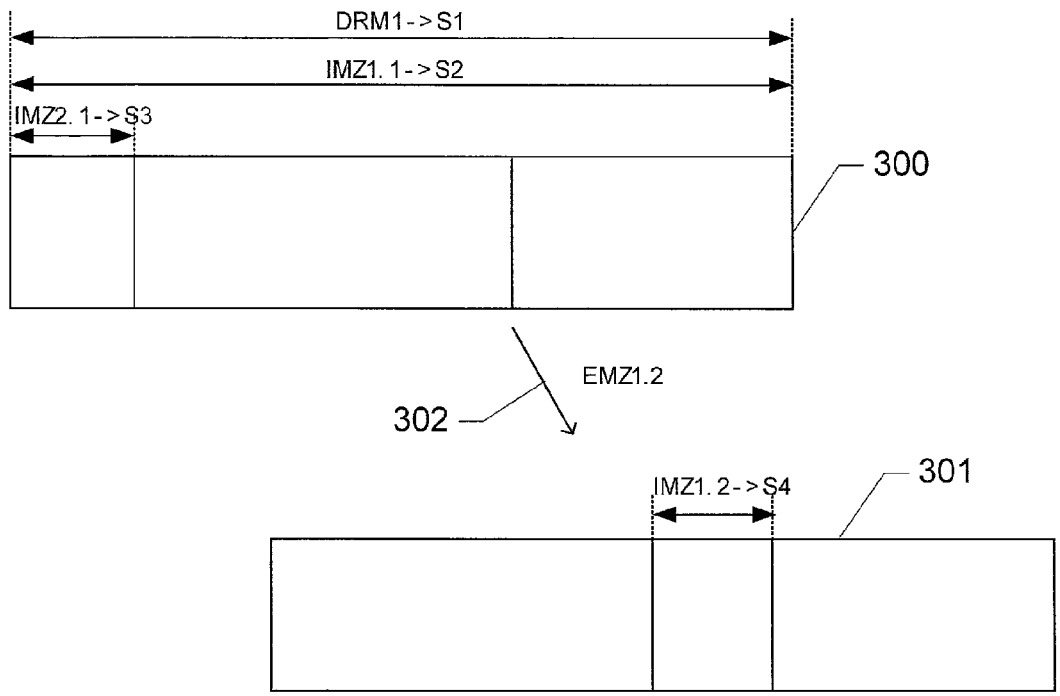
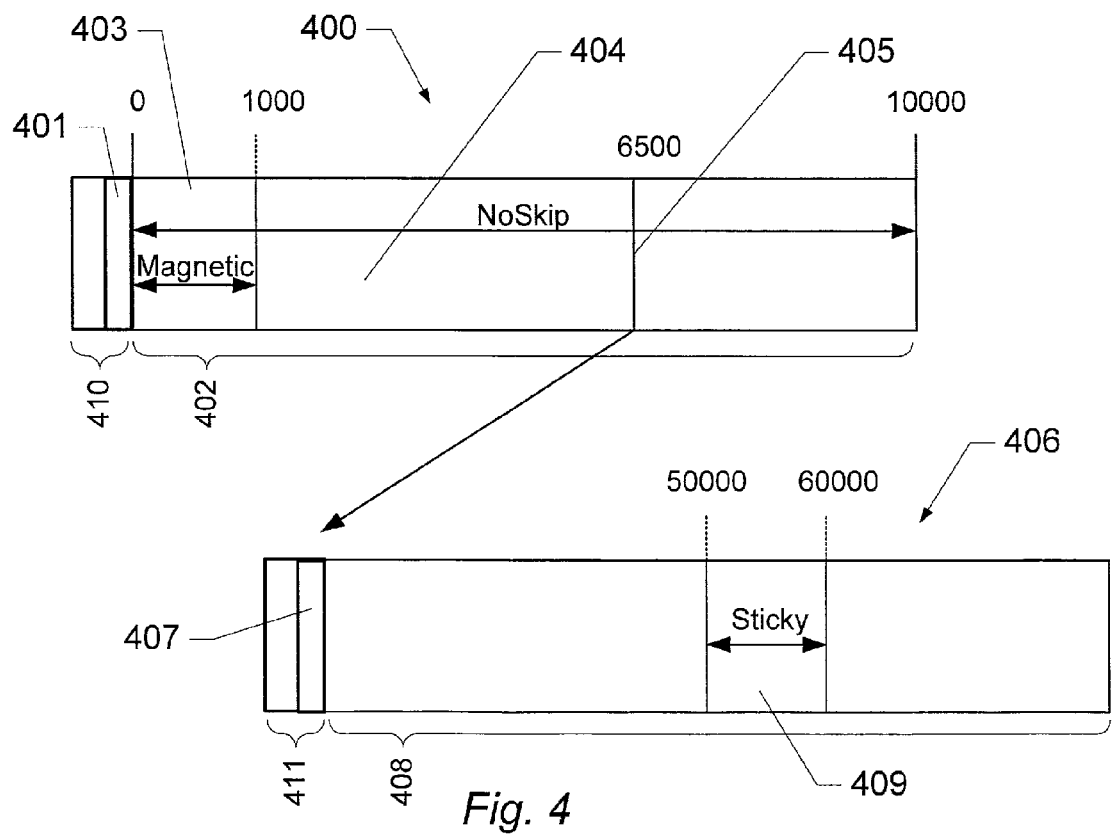

METHOD AND DEVICE FOR IMPOSING USAGE CONSTRAINTS OF DIGITAL CONTENT

CROSS-REFERENCE TO RELATED APPLICATIONS

This application claims priority under 35 U.S.C. §119 to European Patent Application No. 10166689.9, filed Jun. 21, 2010, which is hereby incorporated herein by reference in its entirety. This application also claims the benefit of U.S. Provisional Application No. 61/262,592, filed Nov. 19, 2009, which is hereby incorporated herein by reference in its entirety.

TECHNICAL FIELD

Disclosed herein are a method, product means, and a device for imposing usage constraints of digital content.

BACKGROUND

In many situations it is desirable to impose usage constraints such as forced play-out on digital content. Forced play-out is a functionality that can e.g. be used to control that a user cannot skip certain advertising parts when watching a video clip, or other content. By ensuring this, advertisers may be willing to subsidize the cost of the content access.

The Open IPTV Forum standardization (OIPF) imposes certain requirements on this type of functionality. To fulfil these requirements, the Marlin Developer Community (MDC), which develops one of the content protection solutions that are recommended by OIPF, has created an extension to Marlin that is called the Dynamic Media Zones (DMZ) specification. OIPF is considering adopting a solution for forced play-out control that is based on Marlin DMZ. The DMZ solution is developed to be used together with the Marlin Digital Rights Management solution.

Digital Rights Management (DRM) refers to a range of access control technologies that can be used by e.g. hardware manufacturers, publishers, copyright holders and individuals to impose limitations on the usage of digital content and devices. The term is used to describe any technology which controls uses of digital content and, in particular, restricts uses that were not desired or foreseen by the content provider.

However, there remains a need for a method and system for imposing usage constraints that is less dependent on any specific DRM system.

SUMMARY

Disclosed herein are a method and a processing device for imposing one or more usage constraints on digital content, the method comprising communicating a digital content data item to a digital content receiver system; wherein the digital content data item includes the digital content and a usage constraint data item and/or a reference to a usage constraint data item, the usage constraint data item being indicative of the one or more usage constraints.

Hence in embodiments of the method described herein, use case specific data, i.e. the data describing usage constraints e.g. that a player must not fast forward over a certain section of content, is partitioned such that all of it is included in the parts that are delivered together with, or associated with, the content instead of added to a digital license authorising use of the content. Consequently, existing content protection solutions, such as the Open Mobile alliance (OMA) DRM, and Windows Media (WM) DRM may be used. Additionally, there is less interaction between the DRM system and the Player necessary. Furthermore, it is even possible to support use cases where no DRM system is present. Yet alternatively a non-DRM digital rights control entity may be used such as the Declarative Application Environment (DAE) in an Open IPTV Forum (OIF), instead.

In some embodiments, the usage constraint data item further comprises a digital rights object and/or a reference to such a digital rights object, the digital rights object being indicative of a permission to use the digital content and/or whether one or more constraints apply to the use of the digital content. The digital rights object (also referred to as a digital license) may express permissions and constraints imposed on the digital content, and the digital rights object is adapted to be evaluated by a data processing device so as to determine whether the constraints apply to a given digital content or not. Embodiments of usage constraint data items disclosed herein express usage constraints imposed on the digital content into which they (or at least a reference to them) are included, e.g. in the form of restrictions and/or obligations. Embodiments of the usage constraint data item disclosed herein are different from a digital rights object. In particular, in embodiments disclosed herein, the usage constraint data item is adapted to not itself be evaluated as to whether the constraints apply or not. Instead, the usage constraint data item is linked to a digital rights object, and the outcome of an evaluation of said digital rights object is then used, e.g. as a yes/no response, to determine whether the constraints identified by the usage constraint data item shall be applied or not. Hence, it is a combination of the digital rights object and the usage constraint data item that is indicative of whether the usage constraints indicated by the usage constraint data item are to be applied. Consequently, the usage constraint data item may conveniently also be referred to as a usage constraint extension data item or a license extension data item.

The usage constraint data item may be included in the digital content data item in a number of ways, e.g. embedded in the content to be rendered or otherwise processed, or included in additional data, e.g. DRM metadata specified by a metadata format of a digital rights management system, which may be communicated together with the digital content, e.g. as part of the digital content data item. In some embodiments, the usage constraint data item may be or include a link to a data item specifying the one or more usage constraints. In general, the media presentation to be rendered does not have to include any DRM specific data; in some embodiments it is sufficient that a usage constraint data item is included and a link to the DRM client in the processing device executing the player or some other trusted entity is available, e.g. a CA system that may be based on a smart card (e.g. CI) or a software component in the processing device.

In some embodiments, the method comprises including a zone map data item or a reference to a zone map data item into the digital content data item, wherein the zone map data item identifies one or more media zones.

A media zone is an identifiable portion of the digital content. While the definition of a zone may depend on the type of digital content and/or the file format used, in the context of streamable media, a zone typically refers to a span of a media stream. A span of media stream may be bounded by two points in that stream. For example, a zone map may be included into a media file and identify one or more media zones.

In particular, a zone map may be a data structure, e.g. a table, including one or more zone description data items, each zone description data item including data indicative of one or more properties of a respective media zone of the digital content.

Embodiments of a zone map data item may include one or more zone content identifiers (zone content IDs), each associating a media zone or an entire zone map with a digital rights object. Furthermore, the zone map may include additional information associated with each zone, e.g. use case zone constraints imposed on the respective zones (for example identified by a zone type attribute), information identifying a DRM system that governs the respective usage constraints, and/or the like. Alternatively or additionally, the zone map may include additional information applicable to all zones identified in the zone map, e.g. an identification of a DRM system governing the usage constraints imposed on all zones. Hence, in some embodiments, the usage constraint data item may be a zone map including information about usage constraints thereby providing a data structure particularly suitable for imposing zone-specific usage constraints, such as in a forced playout use case.

Using a zone content ID signalled in the zone map, an entity processing the digital content data item, e.g. a media player, may contact the DRM system identified in the zone map so as to check whether the entity is entitled to process (e.g. play, render, or otherwise present to a user) the content obeying the signalled usage constraints.

To this end, the DRM system may identify a digital license associated with a zone content ID. If no license matching the Zone Content ID is present, or if a license matching the Zone Content ID is present, but the license does not grant a "use", the DRM system may prevent access to the governed content identified by the zone content ID. If a license matching the Zone Content ID is present, and if the license grants a "use", the DRM system and/or the entity processing the zone obligation identified in the zone map may cause the identified zone obligation to be honoured, e.g. by preventing one or more predefined functions, e.g. a fast-forward function.

In some embodiments, a key may be stored per zone in the zone map, and the key may be used to decrypt the content in this zone, i.e., as a content encryption key for the zone. Typically, this key will be stored in an encrypted form using a key in the license of the DRM system governing access to the zone to encrypt it.

In some embodiments multiple, different zone maps are associatable to a single piece of content, e.g., by embedding an array of zone maps into the digital content data item, e.g. an MP4 media file or a media file according to another media format. Consequently, different usage models may be represented.

Generally, media zones may either be embedded in the content file (internal media zones), or exist outside this file (external media zones). In some embodiments, the method includes handling of external media zone data. External media zones may be handled identical to a media presentation, and they can be nested to any level, i.e. limited only by HW resources.

Some embodiments of the method described herein specify how a player application, or another entity processing the digital content, utilizes the DRM solution services in order to fulfill the use case, but without introducing any new, use case specific, requirements on the DRM solution.

The digital rights management protection mechanism may be any suitable mechanism for enforcing permissions associated with digital contents. For example, the digital rights management agent may utilise a public key infrastructure. In one embodiment, the DRM agent has associated with it a unique private/public key pair and a certificate. The certificate may include additional information, such as maker, device, type, software version, serial number(s), and/or the like. This allows a content provider and/or a rights issuer (RI) to securely authenticate the DRM agent. The DRM agent may be provisioned with a unique private key and an associated certificate identifying the DRM agent and certifying the binding between the agent and the key pair. This allows a rights issuer to securely authenticate the DRM agent using a standard PKI procedure.

According to another aspect, described herein is a method for processing digital content, the method comprising:
receiving a digital content data item, the digital content data item including the digital content and a usage constraint data item or reference thereto, the usage constraint data item being indicative of the one or more usage constraints;
processing the digital content included in the received digital content data item; wherein processing includes enforcing the one or more usage constraints indicated by the usage constraint data item included in the digital content data item.

For the purpose of the present description the term digital content is intended to comprise any one or more digital data items including e.g. computer-executable instructions and/or other types of computer-executable code, and/or any type of other information, e.g. text, an image, multimedia content, database content, operational parameters of the processing device, and/or the like.

The present invention relates to different aspects including the methods described above and in the following, corresponding apparatus, systems, and products, each yielding one or more of the benefits and advantages described in connection with the above-mentioned methods and/or one of the other aspects, and each having one or more embodiments corresponding to the embodiments described in connection with the above-mentioned methods and/or one of the other aspects.

In particular, disclosed herein are embodiments of a data processing system, comprising a communications interface for communicating digital content data items; wherein the data processing system is adapted to perform the method of imposing one or more usage constraints on digital content as defined herein.

Further disclosed herein are embodiments of a processing device comprising a communications interface for receiving digital content data items and a processing unit for processing the received digital content data items, wherein the processing device is configured to perform the steps of the method for processing digital content defined herein.

The terms processing device, data processing system, and data processing device are intended to comprise any electronic device comprising processing means for data processing. In particular, the term processing device is intended to comprise any electronic equipment, consumer electronics device, portable radio communications equipment, and other handheld or portable devices, personal computers or other computers or data processing systems, set-top boxes, cable boxes, etc.

The term portable radio communications equipment includes all equipment such as mobile terminals, e.g. mobile telephones, pagers, communicators, electronic organisers, smart phones, personal digital assistants (PDAs), handheld computers, or the like.

Further disclosed herein are embodiments of a digital content data item comprising digital content and at least one of a usage constraint data item and a reference to said usage constraint data item, the usage constraint data item being indicative of one or more usage constraints to be imposed on the digital content when the digital content is processed by a digital content receiver system. The digital content data item may be embodied as a storage medium, e.g. a hard disc, an optical disc, a compact disc, a DVD, a memory stick, a memory card, an EPROM, and/or the like, having stored thereon the digital content data item. Alternatively, the digital content data item may be embodied as a carrier wave modulated to represent a data signal indicative of the digital content data item.

In some embodiments, the digital content data item includes a zone map data item including one or more zone description data items, each zone description data item comprising data indicative of a media zone of the digital content, and the use data item is included in the zone map.

In some embodiments, the digital content data item comprises a plurality of zone maps, each zone map being indicative of respective usage constraints.

In some embodiments, each of the one or more zone description data items is an internal zone description data item or an external zone description data item; wherein each internal zone description data item comprises data indicative of a media zone included in the digital content data item, and wherein each external zone description data item comprises data indicative of an external media zone obtainable from a location external to the digital content data item, and to which a reference is included in the digital content data item.

In some embodiments, each external media zone description data item comprises a reference to an insertion point in the digital content where the corresponding external zone is to be inserted, a reference to a location from which the external content is downloadable, an external zone identifier associating the external content with a digital rights object; and a timing parameter for controlling the time relative to the insertion point of the external content at which the player downloads of the external content.

In some embodiments, the digital content data item comprises a reference to a digital rights control entity such as a digital rights management system.

It is noted that the features of the methods described herein may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Hence, according to another aspect, a computer program comprises program code means adapted to cause a data processing device to perform the steps of the method described herein, when said computer program is run on the data processing device. For example, the program code means may be loaded in a memory, such as a RAM (Random Access Memory), from a storage medium or from another computer via a computer network. Alternatively, the described features may be implemented by hardwired circuitry instead of software or in combination with software.

BRIEF DESCRIPTION OF THE DRAWINGS

The above and other aspects will be apparent and elucidated from the embodiments described with reference to the drawing in which:

FIG. 3 shows an example of media zones in a media presentation, and the different logical rendering sessions that they imply.

FIG. 4 shows another example of a digital content data item including a reference to an external media zone.

DETAILED DESCRIPTION

Figure 1:
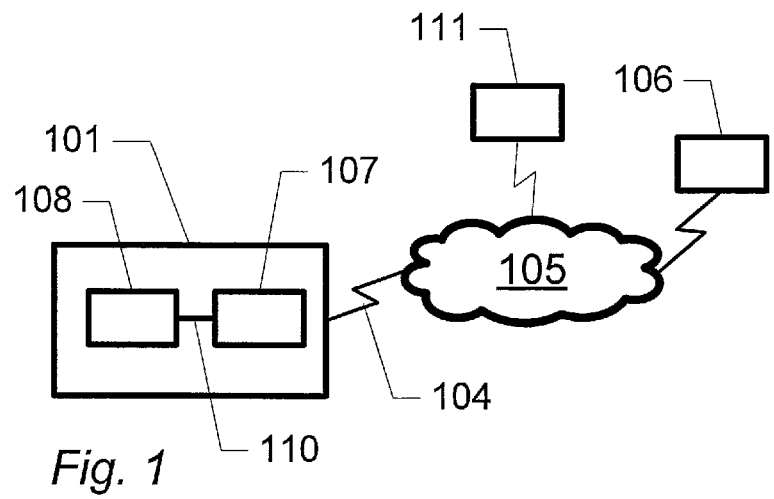
FIG. 1 shows a schematic block diagram of an embodiment of a system for distributing digital content.

FIG. 1 shows a schematic block diagram of an embodiment of a system for distributing digital content.

The system comprises a processing device 101 suitable for presenting and/or otherwise processing digital content, e.g. a suitably programmed stationary or portable computer, a handheld device such as a mobile telephone, a media player, etc.

The processing device 101 comprises a communications interface 104, e.g. a network interface circuit or another suitable interface for connecting the processing device with a computer network 105, e.g. the internet, a telecommunications network, and/or the like. It will be appreciated that, in some embodiments, the connection may be via another devices, such as a gateway of a domestic entertainment system, e.g. in the form of an application-specific hardware box, a suitably programmed computer, or the like.

Hence, the processing device 101 may receive digital content from a digital content provider 106 via the computer network 105. The received digital content may be protected or unprotected. The processing device may then present the digital content to a user or otherwise process it. To this end, the processing device 101 comprises a first processing component 108—in the following also referred to as player 108—for presenting and/or processing the digital content, e.g. a software component executed by a programmable processing unit of the processing device, or a hardware circuitry configured to process digital content. For example, the first processing component may be a software application for processing and presenting media such as a media player, a video player, an audio player, a rendering application, a picture viewer, and/or the like. Alternatively or additionally, the first processing component may include an execution environment for executing received software, or the like.

The processing device 101 further comprises a DRM agent 107 of a suitable DRM system for enforcing permissions/constraints to the received digital content and for decrypting the digital content if the permissions/constraints so allow. In the example of FIG. 1, the DRM agent 107 and the first processing component 101 are shown as two separate components connected by an internal interface 110. For example the DRM agent and the first processing component may be respective software applications executed by a programmable processing unit of the processing device and communicating with each other via a suitable inter-process communication mechanism, via shared memory, via suitable input-output files or streams, or via any other suitable mechanism. Hence, as illustrated in the example of FIG. 1, the DRM agent and the player may be different functional units in a single physical unit, e.g. different computer programs or different functional components of a single computer program. Alternatively, the DRM agent and/or the first processing component may be implemented fully or in part as a hardware component. Alternatively, the first processing component and the DRM agent may be implemented in respective processing devices connected by a suitable communications interface. The DRM agent may be a software component implemented in accordance with any suitable DRM system, e.g. Windows media DRM, OMA DRM, etc.

The content provider system 106 may e.g. be in the form of a web server or other data processing system connected to the computer network 105. The content provider system provides digital content to the processing device, e.g. in the form of downloadable files or media streams which the processing device may receive via the internet or another suitable computer network. Even though not explicitly shown in FIG. 1, it will be appreciated that the processing device may receive digital content from more than one content provider.

The system further comprises a rights issuer system 111 of the DRM system, e.g. in the form of a web server or other data processing system connected to the computer network 105. The rights issuer system provides digital licenses for download, normally subject to a suitable authentication and authorisation of the recipient of the license.

The typical behaviour between the player 108 and the DRM system embodied by the DRM agent 107 and the rights issuer system 111 when the player accesses a DRM protected file (e.g. a file received from the content provider system 106) is that the player 108 sets up a rendering session with the DRM agent 107. This is initiated by an "open session" call to the DRM agent, where the Player provides certain data to the DRM agent, as a minimum a Content Identifier (CID) parameter that is used for logically binding the content to an associated rights object. The DRM system then uses the CID to find the associated rights object in its license repository. For example, the DRM agent may request the corresponding license from the rights issuer system 111. Alternatively, the rights object may already be available in the processing device, e.g. because it may have previously been downloaded. If found, the rights object is evaluated by the DRM agent 107. If the evaluation finds the rights object and the corresponding permissions/constraints to be valid, the session is opened with the Player, in all other cases it is aborted. It will be appreciated that a rights object may comprise several sets of permission/constraints. Therefore, the caller typically provides not only a CID, but also which permission, and its corresponding constraints, to evaluate. If opened, the Player then goes on with sending chunks of encrypted data to the DRM agent 107 for decryption, it signals that the rendering session is flagged as successful, and finally it closes the session.

Figure 2:
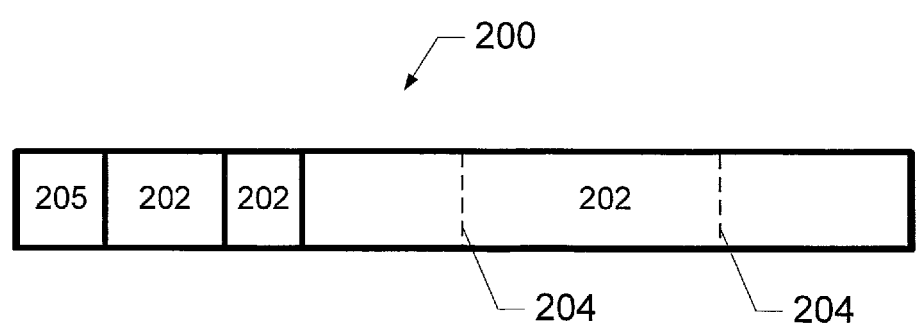
FIG. 2 shows a schematic diagram of an embodiment of digital content data item.

FIG. 2 shows a schematic diagram of an embodiment of digital content data item. The digital content data item 200 that includes several zones 202. For example, the digital content data item 200 may comprise an entire media presentation that includes a movie and additional content items associated therewith, e.g. copyright warnings, trailers, commercials, bonus content, previews, etc. A digital content data item 200 may also include a number of markers 204 at which additional content (e.g. commercials) can be inserted at a later time, i.e. at some time after creation of the digital content data item, e.g. shortly before or even during presentation of the digital content by a player device. Such additional content will also be referred to as "external zones." When the digital content data item 200 is packaged in accordance with a DRM system, access to or other use of some or all of the content included in digital content data item 200 can be governed by associated licenses (sometimes also referred to as controls). In the example of FIG. 2, the zones are not shown as overlapping. However, it will be appreciated that a digital content data item may comprise overlapping zones.

The digital content data item 200 further comprises a data structure referred to as zone map 205 which specifies the zones 202 and possible markers 204. As described in more detail below, embodiments of the zone map disclosed herein further define how the zones 202 and 204 that make up the digital content data item 200 are to be accessed or otherwise used, and what the consequences of such access or other use are to be, e.g. which constraints are to be imposed on such use.

The specification "Marlin Dynamic Media Zones", Version 1.0, Final, Marlin Developer Community, Jan. 25, 2008, retrievable at http://www.marlin-community.com (in the following referred to as the "DMZ specification") defines the term media zones and describes the properties of these media zones. This prior art specification further describes an example of how they can be defined in relation to a content file. They can either be embedded in the content file (internal media zones), or exist outside this file (external media zones). This is defined in a data structure called zone map, which is embedded in the content file, e.g. in a box based file format (ISO Base Media File Form) or in a non-box based file format. In some embodiments, the zone maps described herein may be based on the zone map definition disclosed in the DMZ specification. However, in the embodiments disclosed herein, the parameters included in the zone map and their use differ from the prior art zone maps specified in the DMZ specification. Hence, the specification of the parameters used in the zone map and their interpretation by the processing component using the zone map differ.

In particular, embodiments of the zone map data for internal media zones described herein differ from the zone maps disclosed in the DMZ specification in the following three aspects:

1) The zone map comprises a parameter identifying a media zone type which is indicative of zone usage constraints to be observed by the player when playing the corresponding zone. For example, in one embodiment, the media zone type may assume three values (Magnetic/Sticky/NoSkip), where the respective values may indicate the following usage constraints:

NOSKIP: The player application must not automatically skip this zone: the zone must be played as an integral part of the presentation.

MAGNETIC: If the player application attempts to seek inside the zone from a playback position outside the zone, then the playback must begin at the 'fromPoint' point of the zone.

STICKY: If the player enters this zone, it must disable the ability to fast-forward or to skip this zone until the playback position is outside the zone.

Rather than including this information in a digital license, this information is included in the zone map.

2) Instead of a zone identifier parameter that is used to enable a common logical reference to zones from both the zone map and the license, the zone map includes a Zone Content ID that is used to logically link either a complete zone map or a single zone in the zone map to a rights object. This is done by interpreting it as a Content identifier (CID), causing the DRM system to handle the referenced media zone map or zone just like it handles any other protected content. Hence, the media zone specific parts of the use case become transparent for the DRM system.

3) The zone map includes a "DRM system ID" that identifies the DRM system that is responsible for the zone obligation enforcement. While DRM systems provide a high degree of security, it will be appreciated that, instead of a DRM system, the DRM system ID may refer to a non-DRM control entity, e.g. the DAE in an Open IPTV Forum OIF, instead. The DAE is a declarative language based environment (browser) based on CEA-2014 for presentation of user interface and including scripting support for interaction with network server-side applications and access to the APIs of the other OITF functions. Optionally, the zone map may further comprise rights issuer information, e.g., a RI URL or a silent rights URL, from which the DRM system can download the license, in case it does not have it already.

In the following an example of a definition of a zone map data structure is disclosed:

```
struct {
  uint32 ZoneStartPoint; // defines the start point of the zone, e.g. in byte offset, or AUs
  uint32 ZoneEndPoint; // defines the start point of the zone, e.g. in byte offset, or AUs
  ZoneTypeDefinition ZoneType; // defines the zone type (Magnetic/Sticky/NoSkip)
  CIDDefinition InternalContentZoneIdentifier; //optional logical link to rights object
                                        (may be mandatory if not present per zone map)
  keyType encrypted_zone_key; // optional encrypted key used to protect the content of the
                              zone
} InternalZoneDefinition;
struct {
  uint32 ZoneInsertionPoint;    // insertion point at which an external zone is to be inserted,
                              in byte offset, or AUs
  URLDefinition ExternalZoneURL;    // for download of the media zone
  CIDDefinition ExternalZoneIdentifier; // logical link to rights object
                                        (may be mandatory if not present in external zone map)
  uint32 NumberOfValidZones;
  CIDDefinition ValidZoneIdentifiers[NumberOfValidZones];//logioal links to "always valid"
rights objects
  uint32 DownloadTiming;   //max no of secs d/l may start in advance
  keyType encrypted_zone_key; // optional encrypted key used to protect zone's content
} ExternalZoneDefinition;
struct {
  uint32 NumberOfInternalZones;
CIDDefinition MapContentZoneIdentifier; //optional logical link to rights object
InternalZoneDefinition InternalZone[NumberOfInternalZones];
  uint32 NumberOfExternalZones;
  ExternalZoneDefinition ExternalZone[NumberOfExternalZones];
  URLDefinition DRMSchemeSelection; // for negotiation about DRM scheme
  URLDefinition DRMLicenseServer; //may be needed when presentation is not DRM protected
  SignatureDefinition Signature; // Digital Signature over above data
} ZoneMapDefinition;
struct {
ZoneMapDefinition ZoneMaps[NumberOfZoneMaps];
  uint32 NumberOfZoneMaps;
} ZoneMapSetDefinition
```

Hence, in embodiments described herein, the DRM agent does not need to communicate any media zone obligation data to the Player. Thus, there is no media zone specific data to be evaluated by the DRM agent, nor any media zone obligation data needs to be returned to the Player. The DRM agent may evaluate the associated license as for any other DRM protected data, and the return message is interpreted by the Player as whether to grant access to the content respecting the media zone obligation or not. Hence, in embodiments of the zone map described herein, while the zone type is included in the zone map, any metering functionality may still be handled by the general DRM scheme.

It may be worthwhile noting that the placement of the zone type parameter in the zone map rather than in the license does not affect the overall security. In both cases, the Player is ultimately responsible for enforcing an obligation for a zone, e.g., to disable fast-forward in case of a zone with the flag NoSkip.

As described above, the zone map data structure may include a definition of one or more external zones, i.e. zones that are not themselves included in the digital content data item. In addition to specifying where in the content an external media zone is to be inserted (or "spliced") the zone map may include one or more parameters that specify how these media zones are located and accessed. Further, it will be appreciated that embodiments of the zone map described herein allow more than one level of external media zones, i.e. external media zones referenced from an external media zone.

In particular, as illustrated by the above example of a data structure, a specification of an external media zone included in a zone map may comprise a URL indicative of a location from which the external media zone can be downloaded, and optionally a URL for the associated license (if this is not part of the license download for the content file).

Furthermore, an identifier referencing the external media zone is in the license interpreted as a CID (just as in the internal media zone case).

As described in more detail below, this allows each media zone defined inside the external media zone to be able to reference a rights object that is always valid. In the case that an external media zone is DRM protected, and the associated license is invalid, there may normally not be any possibility for the Player to select to render this (typically on a request from the user). Therefore the zone map includes a possibility for external media zones to include external media zone content IDs that point to licenses that are always valid. Hence, if the opening fails, the Player may attempt a new opening referencing to this EMZ ID instead.

It may be interesting to note that the same may not be needed for internal media zones, because if they are encrypted, they are so by the same key as for the entire media presentation, and if that license invalidates decryption, then there is no reason for being able to view the media zones. However, if external media zones are encrypted, then they are so under a different license/key than the media presentation.

It may be appreciated that, in some embodiments, it may be sufficient to provide one rights object per external media zone. Consequently, in the above-described definition of a zone map data structure, the data structure for these rights objects:

```
uint32 NumberOfValidZones;
  CIDDefinition  ValidZoneIdentifiers[NumberOfValidZones];//
logical  links  to"always valid" rights objects
may be replaced by a definition for only one rights object:
  CIDDefinition ValidZoneIdentifier; //logical link to "always valid" rights
  object
```

It will be appreciated that, in such embodiments, only one key (from one rights object) is used for decrypting the entire media presentation, including all internal media zones, but excluding external media zones. For the latter the same concept applies, i.e. if they refer to external media zones, another key/licenses is used.

The Player will typically access the zone map data before rendering of the content (or an external media zone) is initiated, thus allowing the player to initiate a download before the player reaches the point in time when the media zone is to be rendered. However, as the Player may be designed to allow other data to be sent together with the zone identifier, such as real-time user feed back, etc, it may be that this download should be done close to the point in time when it is to be rendered. Therefore a download timing parameter may be added to the definition of an external media zone.

In the following, it will be described how the Player interacts with the DRM system (identified by the DRM system ID) in cases where media zones are defined in the media presentation to be rendered. For the purpose of the present description, two cases will be described: 1) an embodiment having a Zone Content ID per zone map and 2) an embodiment having a Zone Content ID per zone.

1) Zone Content ID Per Zone Map:

When accessing content for which the usage is governed by a zone map, the player requests the DRM agent to search for a license with a content ID equal to the Zone Content ID of the zone map. If such a license is found and if the evaluation of the license grants access, the DRM agent allows the media player to access the content in the same way as it allows it for other protected content.

For internal media zones, it is then up to the media player to enforce the play-out obligations for content governed by respective media zones of the zone map, e.g. to disallow fast forwarding in certain sections. This may imply that all internal media zones follow the same permission/constraints.

Content belonging to external media zones are downloaded using the URL in the zone map (including possibly also a download of the associated license). The downloaded media zone is handled as a complete, stand-alone media presentation. If the presentation is DRM protected, a new rendering session is opened. The opened session is then handled as for any normal protected data, i.e. the data is decrypted (if encrypted), logged as successful, and later closed.

If multiple zone maps are present, the player selects a zone map to which it has or can get access, i.e., where it has a corresponding license and supports the DRM system.

It may be interesting to note that, in this case, the original Content ID (e.g. signaled in DCF Common Headers) is not used for retrieving license. In this case the DRM system may include information about the specific use case. To signal that the Content ID shall not be used, it may e.g. be set to zero, which then may cause the DRM agent to look for the CID in the zone map.

2) Zone Content ID Per Zone of a Zone Map:

In this embodiment, the Player may operate according to the following rules: A separate rendering session is opened, and managed, for every media zone that the player is about to render, in the same way as it does for every DRM protected content that it is about to render. However, only the session opened related to the license pointed out by the "non-extended" DRM system (the original CID as mentioned above) is used for decrypting the media. The other sessions/rights objects are only used for validating the obligation.

For internal media zones, there is no data rendered using the associated session as reference. In all other aspects, the session is handled as for any normal protected data, i.e. it is logged as successful, and later closed.

For external media zones, the player downloads the content using the URL included in the zone map (including possibly also a download of the associated license). The downloaded media zone is handled as a complete, stand-alone presentation. If the presentation is DRM protected, a new rendering session is opened. The opened session is then handled as for any normal protected data, i.e. the data is decrypted (if encrypted), it is logged as successful, and later closed. Any internal media zones in this external media zone may be handled as in a media presentation; any external media zones may again be handled as a stand-alone presentation.

The Player interprets a media zone opening response from the DRM system as follows: If the DRM agent has access to an associated license, then the player interprets a successful opening as that the media zone obligation must be granted, and a failed opening is interpreted as the media zone obligation may be skipped (depending on user selection). Hence, a user can overrule and watch a media zone, even if he is not obliged to, but he can not overrule and skip it, if he is obliged to see it. In the case that the DRM agent does not have access to an associated license, then it shall interpret a failed opening as that the media zone obligation must be granted.

For the Player to know whether the DRM agent has access to an associated license, it may call a license status enquiry interface before calling the open session interface. The reason for this Player behaviour is that the absence of a license shall not lead to that the media zone obligation can be skipped. As the DRM agent at some point will purge the license database, the Player should keep state information for content that has had a valid license, that became exhausted, and where the license thereafter has been deleted. How long this state is kept can be configurable, or/and set by the user. Also, the reception of a new license will delete it.

The application of the above rules by a Player will now be described with reference to the example shown in FIG. 3 for the case of a Zone Content ID per zone. In particular, FIG. 3 shows an example of media zones in a media presentation included in a DRM protected container 300, and the different logical rendering sessions that they imply.

In the example media presentation shown in FIG. 3 it is assumed that the media presentation is DRM protected, and that a license for the presentation, and for all media zones referenced in the zone map, has been downloaded. In FIG. 3, the DRM protected container 300 is denoted DMZ1 referring to DMZ protected container no. 1. internal media zones are denoted as IMZx.y referring to Internal Media Zone x in container y. External media zones are denoted as EMZx.y referring to External Media Zone x in container y. DRM sessions set up by a player playing the media presentation are denoted Sx referring to session x. FIG. 2 further shows a second container 301 including external media zone content.

Following the general behaviour of the player described above, a session (S1) is set up between the Player and the DRM system. Assuming that the DRM system found the rights object associated to the CID of session S1 to be valid, the Player is then about to begin the rendering of the media presentation. However, as the player has earlier found and read the zone map data in the media presentation file, it knows (in this example) that the entire media presentation is defined as an internal media zone.

Hence, the player opens another session (S2) with the DRM system (after first making a license status enquiry call), using the Internal media zone ID 1 (IMZ ID 1) as the CID when calling the DRM system. The DRM system then finds and evaluates the rights object that is associated to the IMZ ID 1, and returns the evaluation result in the form of accepting to open this session or not. The Player interprets this together with the result from the license status call as described earlier.

In the example of FIG. 3, there is also a second internal media zone defined in the zone map that starts from the beginning of the media presentation. This leads to that a third session (S3) is opened with the DRM system (after first making a license status enquiry call), using the IMZ ID 2 as CID.

Assuming that all opened sessions succeeded, and that the Player is instructed by the zone map to begin rendering from the start of the presentation, the Player will now start to read encrypted data, and send it to the DRM system for decryption. Following the rules stated above, this rendering is carried out inside session S1. However, before the data within the internal media zone IMZ2.1 is consumed, the associated session (S3) is logged as successfully rendered, and then closed when all data within that session is consumed.

The rendering then continues inside session S1 until the point where the zone map defines the External media zone EMZ1.2. At this point, or earlier if the Player so decided (and the zone map data allowed), the Player downloads the External Media Zone using the corresponding URL in the zone map (in FIG. 3 illustrated by arrow 302). The Player may in this URL download session include data relating to the user, which may be used to personalize the media zone presentation. The player may obtain these user data and perform the download session using any suitable technique known as such in the art. If the Player concludes that there is no associated license in the DRM system repository (it can enquire the DRM system by referencing to the EMZ ID 1), then it may provide the EMZ ID 1 in the download session. This may be interpreted by the receiving server that a license download session shall be carried out within that session. Alternatively, the player may provide the RI URL to the DRM system, and the DRM system can then acquire the right license from the RI.

The downloaded external media zone presentation is formatted as any complete, stand-alone media presentation, i.e. it may contain a separate zone map (if needed), and it may contain a separate DRM specific data section, etc.

In the example of FIG. 3, the external media zone is not DRM protected. This may be indicated in the zone map by the external media zone content ID, e.g. by setting the external media zone content ID to a predetermined value, e.g. NULL, or otherwise indicating that the external media zone content ID is disabled. It may also be indicated by the MIME type/file extension of the downloaded entity. The Player downloads the external media zone presentation, reads its zone map, and starts to render it. When the player reaches the point where an internal media zone within the external media zone starts, the player opens a session (S4) with the DRM system, just as described for the earlier internal media zones.

When the rendering of the external media zone is finished, the player continues from the point in session S1 where the external media zone was inserted.

In the case of one Zone Content ID per zone map, only a single interaction between the player and the DRM agent at the beginning of a play may typically be necessary. However, everything else follows the principles as described above per zone.

In the case that the media presentation is not DRM protected, a DRM scheme may anyway be used for the evaluation of whether the media zone usage constraints are to be granted or not. Which DRM scheme to use is signaled, preferably in the zone map. For example, the zone map may include a URL that points to a server where the Player can negotiate which DRM scheme that shall be used. The Player then enquires the DRM system about which schemes it supports, and provides this to the server, which then selects one of the supported schemes, and optionally also sends a translation list between the media zone content IDs used in the zone map, and the ones that are to be used in communication with the DRM license server from where the required licenses are to be downloaded. The server also returns a URL pointing to this license server (RI URL). An alternative would be that the zone map just states what DRM scheme that is used.

In the case that an external media zone is DRM protected, and the associated license is invalid, there is no possibility for the Player to select to render this (typically on a request from the user). Therefore the zone map includes a possibility for external media zones to include external media zone content IDs that point to licenses that are always valid. So if the opening fails, the Player can then attempt a new opening referencing to this EMZ ID instead.

In order to ensure a tight binding between a zone map and corresponding media content, the zone map may allow a zone key be specified in the zone map such that the zone key is associated with a zone. The zone key may be a cryptographic key used to protect, e.g. encrypt, content in a zone. The zone key itself is stored per zone and is encrypted using a key in a DRM license governing the usage of the zone or zone map, respectively.

In order to protect the integrity of a zone map, a cryptographic signature over the zone map may be appended to the zone map. If the media presentation is protected, then the DRM system typically includes a signature over the entire media presentation file (including the zone map). Such a signature may, e.g., be computed using a MAC algorithm and the key in the DRM license or using a public key based signature algorithm and the key of a trusted server for unprotected content.

FIG. 4 shows another example of a digital content data item including a reference to an external media zone. The digital content data item 400 of FIG. 4 is assumed to be a file named "ThisMediaPresentation" and it includes a metadata section 410 and digital content 402. The metadata section 410 includes a zone map 401. The digital content includes two internal zones 403 and 404, as well as a marker 405 indicating insertion of an external zone. The external zone is included in a digital content data item 406 which in this example is assumed to be downloadable from "extcid-1@company.com" and which includes a metadata section 411 and digital content 408. The metadata section 411 includes a zone map 407, and the digital content 408 includes an internal zone 409.

The zone maps 401 and 407 may be defined according to the definition of a zone map data structure described above. An example of the contents of the zone map 401 Stored in the metadata box 410 in the ThisMediaPresentation file 400 may be as follows:

```
InternalZoneDefinition InternalZone1= {0, 10000, NoSkip,
    cid:intcid-1@company.com, NULL};
InternalZoneDefinition InternalZone2= {0, 1000,
    Magnetic, cid:intcid-2@company.com, NULL };
ExternalZoneDefinition ExternalZone1 = {6500, NULL,
    cid:extcid-1@company.com, 1, { cid:extcid-1-
    valid@company.com}, 10, NULL};
ZoneMapDefinition ThisMediaPresentation = {2, NULL,
    {InternalZone1, InternalZone2}, 1, {ExternalZone1},
    http://thismediapresentation.rightsissuer.com, NULL,
    MTIzMjM0NDU2NzY4Nzg5MzI=};
```

An example of the contents of the zone map 407 stored in the metadata box 411 in the ExternalZone1 file 406 may be as follows:

```
InternalZoneDefinition InternalZone10 = {5000, 6000,
Sticky, cid:intcid-10@company.com, NULL};
ZoneMapDefinition ExternalZone1 = {1, NULL,
{InternalZone10}, 0, NULL},
http://externalzone1.rightsissuer.com, NULL,
Y4NzMjM0NDU2NzY4Nzg5Mz==};
```

Although some embodiments have been described and shown in detail, the invention is not restricted to them, but may also be embodied in other ways within the scope of the subject matter defined in the following claims.

Any of the embodiments described herein can be used for streaming type protected content and/or for file download type of protected content.

The method, product means, and device described herein can be implemented by means of hardware comprising several distinct elements, and/or partly or completely by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method for processing digital content, the method comprising:

receiving a digital content data item, the digital content data item including the digital content and a zone map data item, the zone map data item including a zone content ID and a usage constraint data item, the usage constraint data item being indicative of one or more usage constraints to be observed by a player when playing a corresponding zone, wherein the usage constraint data item further comprises a reference to a digital rights object, the digital rights object being indicative of at least one of a permission to use the digital content and whether one or more constraints apply to the use of the digital content;

forwarding the zone content ID to a digital rights control entity and requesting the digital rights control entity to verify a digital rights object associated with the zone content ID;

receiving a response from the digital rights control entity indicative of whether a valid digital rights object has been found; and conditioned on the received response, processing the digital content included in the received digital content data item; wherein processing includes evaluating the digital rights object and, conditioned on a result of the evaluation of the digital rights object, enforcing the one or more usage constraints indicated by the usage constraint data item as applicable to the digital content, wherein the zone map data item further includes:

a URL indicative of a location from which an external media zone can be downloaded; and an external media zone content ID that points to a license that is always valid.

2. A processing device comprising a communications interface for receiving digital content data items and a processing unit for processing the received digital content data items, wherein the processing device is configured to perform the steps of a method for processing digital content, the method comprising:

receiving a digital content data item, the digital content data item including the digital content and a zone map data item, the zone map data item including a zone content ID and a usage constraint data item, the usage constraint data item being indicative of one or more usage constraints to be observed by a player when playing a corresponding zone, wherein the usage constraint data item further comprises a reference to a digital rights object, the digital rights object being indicative of at least one of a permission to use the digital content and whether one or more constraints apply to the use of the digital content;

forwarding the zone content ID to a digital rights control entity and requesting the digital rights control entity to verify a digital rights object associated with the zone content ID;

receiving a response from the digital rights control entity indicative of whether a valid digital rights object has been found; and conditioned on the received response, processing the digital content included in the received digital content data item; wherein processing includes evaluating the digital rights object and, conditioned on a result of the evaluation of the digital rights object, enforcing the one or more usage constraints indicated by the usage constraint data item as applicable to the digital content, wherein the zone map data item further includes:

a URL indicative of a location from which an external media zone can be downloaded; and an external media zone content ID that points to a license that is always valid.

3. A processing device according to claim 2, wherein the digital rights control entity comprises a digital rights management system, and wherein the processing device comprises a digital rights management agent and is configured to execute the digital rights management agent.

4. A non-transitory computer readable medium having stored therein program code adapted to perform a method when said program code is executed on a data processing device, wherein the method is for processing digital content, the method comprising:

receiving a digital content data item, the digital content data item including the digital content and a zone map data item, the zone map data item including a zone content ID and a usage constraint data item, the usage constraint data item being indicative of one or more usage constraints to be observed by a player when playing a corresponding zone, wherein the usage constraint data item further comprises a reference to a digital rights object, the digital rights object being indicative of at least one of a permission to use the digital content and whether one or more constraints apply to the use of the digital content;

forwarding the zone content ID to a digital rights control entity and requesting the digital rights control entity to verify a digital rights object associated with the zone content ID;

receiving a response from the digital rights control entity indicative of whether a valid digital rights object has been found; and conditioned on the received response, processing the digital content included in the received digital content data item; wherein processing includes evaluating the digital rights object and, conditioned on a result of the evaluation of the digital rights object, enforcing the one or more usage constraints indicated by the usage constraint data item as applicable to the digital content, wherein the zone map data item further includes:
- a URL indicative of a location from which an external media zone can be downloaded; and
- an external media zone content ID that points to a license that is always valid.

5. The method of claim 1, wherein the usage constraint indicates whether the corresponding zone must be played as an integral part of the presentation.

6. The processing device of claim 2, wherein the usage constraint indicates whether the corresponding zone must be played as an integral part of the presentation.

7. The non-transitory computer readable medium of claim 4, wherein the usage constraint indicates whether the corresponding zone must be played as an integral part of the presentation.

8. The method of claim 1, wherein the usage constraint indicates whether playback of the corresponding zone must begin at a predefined point of the zone if the player attempts to seek inside the corresponding zone.

9. The processing device of claim 2, wherein the usage constraint indicates whether playback of the corresponding zone must begin at a predefined point of the zone if the player attempts to seek inside the corresponding zone.

10. The non-transitory computer readable medium of claim 4, wherein the usage constraint indicates whether playback of the corresponding zone must begin at a predefined point of the zone if the player attempts to seek inside the corresponding zone.

11. The method of claim 1, wherein the usage constraint indicates whether one or more of fast-forward and zone skipping are disabled when the corresponding zone is being played.

12. The processing device of claim 2, wherein the usage constraint indicates whether one or more of fast-forward and zone skipping are disabled when the corresponding zone is being played.

13. The non-transitory computer readable medium of claim 4, wherein the usage constraint indicates whether one or more of fast-forward and zone skipping are disabled when the corresponding zone is being played.

* * * * *